Jan. 19, 1965   H. K. GLEASMAN   3,166,166
HUB AND COASTER BRAKE FOR VELOCIPEDES AND THE LIKE
Filed Dec. 6, 1962
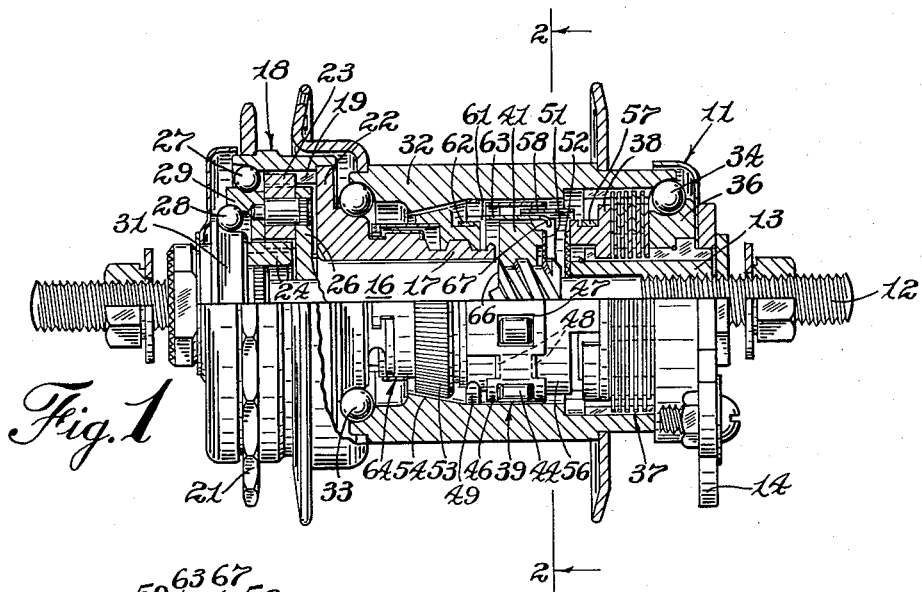
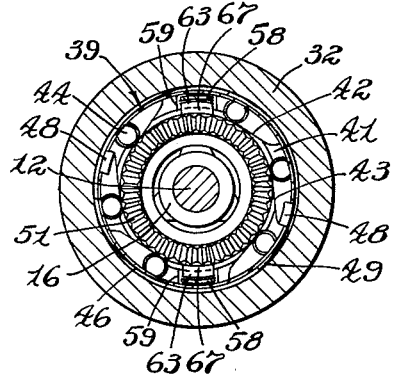
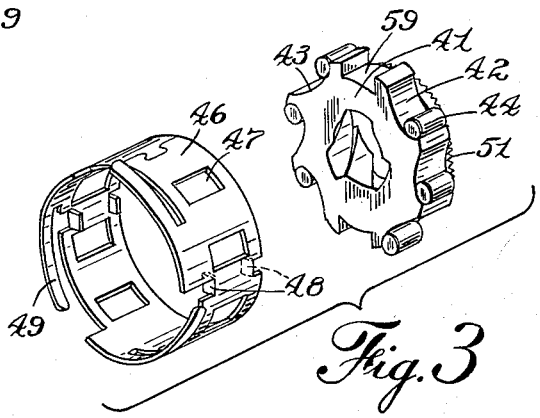
INVENTOR.
Hollis K. Gleasman
BY John Phillip Ryan
ATTORNEY
WITNESS:
Esther M. Stockton.

United States Patent Office 3,166,166
Patented Jan. 19, 1965

3,166,166
HUB AND COASTER BRAKE FOR VELOCIPEDES AND THE LIKE
Hollis K. Gleasman, Elmira, N.Y., assignor to The Bendix Corporation, Elmira Heights, N.Y., a corporation of Delaware
Filed Dec. 6, 1962, Ser. No. 242,873
8 Claims. (Cl. 192—6)

The present invention relates to a hub and coaster brake for velocipedes and the like and, more particularly, relates to that type in which a unidirectional driving connection between the hub and a driving means is provided by a roller clutch mechanism.

It is an object of the present invention to provide a hub and coaster brake which is simple, durable, compact structurewise, reliable, efficient and positive in operation and economical to manufacture.

It is another object of the present invention to provide a hub and coaster brake equipped with a roller clutch, said roller clutch being adapted to alternatively couple the driving mechanisms to either the hub or the coaster brake means.

It is still another object of the present invention to provide a two-speed semi-automatic hub and coaster brake with a high speed conical clutch mechanism and a low speed roller clutch mechanism.

It is still another object of the present invention to provide a two-speed hub and coaster brake having twin driving screw shafts wherein the lateral loading on the bearings supporting the screw shafts is materially reduced.

It is a further object of the present invention to provide a two-speed hub and coaster brake having twin driving screw shafts wherein the thrust loadings incident to a clutch operation are confined to the free extremities of one or more of the screw shafts with the thrust loadings being substantially limited to radial force components.

It is a still further object of the present invention to provide a hub and coaster brake having a low energy loss due to clutch mechanism drag.

The foregoing and other objects and advantages of the invention will appear more fully from consideration of the detailed description which follows in conjunction with the accompanying drawing wherein one embodiment of the invention is illustrated.

The following description is taken in connection with the accompanying drawing in which:

FIGURE 1 is a front elevational view, partly broken away and in section, of a preferred embodiment of the invention illustrating the low speed roller clutch in driving engagement;

FIGURE 2 is a sectional view taken on the plane of line 2—2 of FIGURE 1 but illustrating the low speed roller clutch in its inoperative position; and, FIGURE 3 is an exploded, detail, perspective view of the low speed nut member, the driving rollers and the apertured cage member which, in combination, comprise the low speed clutch mechanism.

In FIGURE 1 of the drawing there is illustrated a partly broken away and sectioned semi-automatic two-speed hub and coaster brake generally designated 11. A stationary axle 12 adapted to be mounted in the frame of the velocipede or the like supports a brake anchor sleeve 13 which, in turn, is secured against rotation by a brake arm 14 mounted and retained thereon by a clamp nut. The brake arm is connected to the velocipede frame by a clip.

The low speed screw shaft 16 is rotatably mounted on the axle and the high speed screw shaft 17 is, in turn, rotatably mounted on the low speed screw shaft. A driving member generally designated 18 includes orbit gearing 19 and a sprocket 21 fixedly secured to the high speed screw shaft by a ring member 22. The driving member, by means of planet gears 23 and a sun gear 24 and a planet carrier 26 secured to the low speed screw shaft, rotates the low speed screw shaft at a different speed or gear. Bearings 27 and 28 journalled in races formed in the sprocket 21, the planet pinion support 29 and the cone adjustment nut 31, rotatably support the driving member and the screw shafts.

The hub 32 is rotatably supported relative to the axle by bearings 33 and 34 journalled in races formed in the high speed screw shaft and in a bearing cone 36, respectively. The bearing cone is fixedly mounted on or is an integral part of the brake anchor sleeve 13. Brake discs generally designated 37 are splined alternately to the hub and the brake anchor sleeve and are arranged to be pressed together against the bearing cone 36 by means of a brake pressure ring 38 also splined to the brake anchor sleeve. The brake pressure ring is slidably retained on the anchor sleeve by a lock ring.

The low speed clutch mechanism generally designated 39 is supported on the threaded extremity of the low speed screw shaft 16. The low speed clutch mechanism includes a nut member 41 threaded on the low speed screw shaft adapted to move toward and away from the brake pressure ring. A plurality of radial recesses 42 formed in the peripheral portion of the nut member open toward the interior hub surface. Each recess is formed with a cam surface 43 eccentrically located relative to the axis of the nut member. A roller 44 of a predetermined diameter is positioned in each recess and is adapted to traverse at least a portion of the cam surface to become wedged between the cam surface and the hub interior. A cage member 46 is rotatably positioned astride the peripheral portion of the nut member. A like plurality of apertures 47 are formed in the cage member with each aperture overlying one of the nut member recesses and encompassing portions of the recess' complementing roller. Inturned tabs 48 abut the radial side walls of the nut member to axially secure the cage member to the nut. A plurality of radially outwardly biased spring fingers 49, formed as an integral part of the cage, frictionally engage the hub interior to sense relative rotation between the hub and the cage member.

The engaging faces of the low speed nut member 41 and the brake pressure ring 38 are provided with dentils 51 and 52, respectively, in order to prevent relative rotation when in engagement.

A high speed clutch nut 53 is threaded on the high speed screw shaft 17 and is adapted to move into and out of clutching engagement with a conical clutch surface 54 formed in the interior of the hub.

A retarder sleeve 56, having arms 57 bearing frictionally in a groove in the brake pressure ring 38, has a plurality of axially extending fingers 58 slidably engaging in axially extending slots 59 formed in the periphery of the low speed nut member to form a splined connection therewith. A second retarder sleeve 61 is provided with arms 62 bearing frictionally in a groove on the high speed clutch nut 53 and has axially extending fingers 63 slidably engaging in the slots 59 in the periphery of the low speed nut member to form a splined connection therewith.

The indexing and selector mechanisms generally designated 64 controllable by the velocipede operator are operably associated with the high speed screw shaft 17 and the high speed clutch nut 53. The indexing and selector mechanisms allow the operator to selectively block or allow the driving engagement of the high speed clutch nut 53 with the hub clutch surface 54. These mechanisms do not form a part of the subject invention and, therefore, will not be described in further detail. A detailed description of the indexing and selector mechanisms may be found in U. S. Patent 2,972,908 issued to Hood and Gleasman.

In operation—starting with the parts in the position illustrated in FIGURE 1, forward rotation of the driving member 18 (which is clockwise when viewing the left-hand extremity of FIGURE 1) is transmitted to the high speed screw shaft 17. The indexing and selector mechanisms 64 are positioned so as to prevent the high speed clutch nut 53 from drivingly engaging the hub clutch surface 54 when the clutch nut is threaded on the rotating high speed screw shaft 17. The low speed screw shaft 16 is concomitantly rotated by the driving member and the low speed nut member 41 threadedly traverses the screw shaft into abutting engagement with the limiting shoulder 66 formed on the low speed screw shaft adjacent the free extremity of the high speed screw shaft. Both the low speed nut member 41 and the high speed clutch nut 53 are caused to threadedly traverse their respective screw shafts by retarders 56 and 61 which frictionally couple the nuts to the stationary axle. Once the nuts abut the shoulder 66 or the indexing mechanism, the retarder will yield and further threading of the nuts on their respective shafts will, of course, cease.

Continued rotation of the low speed screw shaft after the nut member 41 has engaged the shoulder 66 will cause the nut to rotate with its screw shaft. The cage member 46, by reason of its inturned lugs 48, will be axially fixed to the nut 41 and will, therefore, axially move with the nut member. Once the low speed screw shaft and the nut member 41 rotate as a unit, they will unitwise rotate relative to the hub 32. The cage member spring fingers 49 frictionally engage the hub interior thereby tending to retard the cage member relative to the nut member. Retardation of the cage will cause the cage apertures 47 to engage the rollers 44 and urge the rollers up the cam surfaces 43 causing the rollers to become wedged between the cam surfaces and the hub interior. Once the rollers become wedged, the hub will rotate at the same speed as the low speed screw shaft.

It will be readily apparent to those skilled in this art that the use of a roller clutch as compared to a conical clutch will primarily create radial thrust forces which are effectively confined to the low speed screw shaft free extremity. Confining these thrust forces, therefore, will materially reduce the axial thrust loadings imposed on the support bearings 27 and 28. When rotation of the low speed screw shaft stops, the cage member will sense the relative rotational difference between the roller clutch mechanisms 39 and the hub to urge the rollers out of their wedged condition thereby allowing the hub to substantially freely overrun the hub driving mechanisms. The only drag imposed upon the hub during overrun will be the drag created by the sliding engagement between the spring fingers 49 and the hub interior surface. The amount of this drag will be minimal as compared to prior art embodiments.

When it is desired to operate in a high gear the operator will back pedal slightly thus rotating the screw shafts backward. The high and low speed nut members will again be prevented from rotating by their retarder connections to the axle and thus the nuts will be threaded on their respective shafts toward the brake mechanism. The slight backward rotation of the high speed clutch nut 53 will cause the indexing and selector mechanisms 64 to be rotatably displaced in a manner clearly described in U.S. Patent 2,972,908. Upon subsequent forward rotation of the screw shafts, the high speed clutch nut will again be threaded to the left in FIGURE 1 but since the indexing mechanisms are properly indexed at this time the high speed clutch nut will be allowed to threadedly traverse the entire length of the thread of the high speed screw shaft to drivingly engage the hub clutch surface 54 and thus drive the hub at a higher speed or gear. Since the hub is driven at a higher speed, it will rotate at a greater speed than the low speed clutch mechanism 39. The high hub speed will drive the cage member by reason of the spring fingers 49 frictionally engaging the hub and, in turn, the cage member will urge the rollers 44 away from a wedged driving engagement with the hub. During high speed operation there will be minimal drag imposed on the hub by the low speed clutch mechanisms.

In the event the operator desires to operate the brakes he merely back pedals an amount sufficient to cause the low speed nut member 41 to be traversed on the low speed screw shaft 16 in a backward direction and cause the dentil surface 51 of the low speed nut member to engage the dentil surface 52 of the brake pressure ring 33. The backward rotation of the low speed screw shaft 16 causes the low speed nut member to operate the brake pressure ring to compress the brake discs 37 thus braking hub rotation. The dentils provided therebetween effectively prevent relative rotation between the brake pressure ring and the low speed nut member when engagement between these members occurs. The extremities of fingers 63 of retarder 61 coupling the low speed nut member 41 and the high speed clutch nut 53 are inturned as at 67 to limit axial separation between the clutch mechanisms during braking operation thereby preventing simultaneous high speed clutch engagement and low speed clutch brake engagement which will lock up the hub. The structural features of the retarder are clearly defined and claimed in U.S. Patent 2,957,559 issued to Hood and Gleasman.

Although certain structures have been shown and described in detail, it will be understood that changes may be made in the design and arrangement of parts without departing from the spirit of the invention.

I claim:

1. A hub for velocipedes and the like comprising, in combination:

a stationary axle, a hub rotatably mounted relative to the axle, driving means for rotating the driving shaft in forward and backward directions, roller clutch means supported on the driving shaft adapted to provide unidirectional driving engagement with the hub, means responsive to relative rotation between the roller clutch member and the hub for establishing and disestablishing the unidirectional driving engagement between the roller clutch and hub, anchor means secured to the axle, brake means interengaging the anchor means and hub for braking hub rotation, thread means formed on said driving shaft, means for frictionally and yieldably retarding the roller clutch means, and said roller clutch means and said means responsive to relative rotation further comprising, in combination:

a nut member threaded on the driving shaft responsive to driving shaft rotation adapted to alternatively move from and into operative engagement with the brake means, said nut member including a plurality of radial tapered recesses opening toward the hub, each recess taper providing a cam surface;

apertured cage means positioned on the peripheral portions of said nut member, said cage means being axially fixed and rotatably movable relative to said nut member, each of said cage apertures being adapted to overlie one of said nut member recesses;

a roller of a predetermined diameter positioned in each recess and having a portion thereof extending through an overlying aperture in said cage means, said rollers adapted to be wedged between the cam surface and the hub for establishing the unidirectional driving connection; and spring means formed on the cage means biased into frictional engagement with the hub for rotating the cage responsive to relative rotation between the hub and cage means whereby said cage means urge said rollers into and out of the wedged positions.

2. In a hub and coaster brake for velocipedes and the like:
   a stationary axle;
   an anchor member secured to the axle;
   a hub member rotatably mounted relative to the axle;
   brake means interengaging the anchor member and the hub for braking hub rotation;
   a screw shaft journalled on the axle;
   a driving member for rotating the screw shaft in forward and backward directions;
   a roller clutch and brake actuating mechanism supported on the screw shaft adapted to alternatively provide a unidirectional driving connection with the hub and to operatively engage the brake means, said mechanism including:
      a nut member threaded on the screw shaft adapted to move from and into operative engagement with the brake means, said nut member including a plurality of radial recesses opening toward the hub, each of said recesses including a cam surface eccentrically located relative to the axis of said nut member;
      apertured cage means positioned on the peripheral portion of the nut member, said cage means being axially fixed and rotatably movable relative to said nut member, each of said cage apertures being adapted to overlie one of said nut member recesses;
      a roller of a predetermined diameter positioned in each recess and having a portion thereof extending through an overlying aperture in said cage means, said rollers adapted to be wedged between the cam surface and the hub for establishing the unidirectional driving connection;
      spring means formed on the cage means biased into engagement with the hub for rotating the cage responsive to relative rotation between the hub and cage means, whereby said cage means urge said rollers into and out of a wedged position; and,
   means for frictionally and yieldably retarding said nut member.

3. A hub for bicycles including a conical clutch surface formed on the hub interior, a stationary axle supporting the hub, a plurality of screw shafts supported on the axle, complementing driving clutch members supported one on each of the screw shafts for drivingly engaging the hub, means for rotating the screw shafts in forward and backward directions at different speeds, means for frictionally and yieldably retarding the driving clutch members, one of said driving clutch members comprising a clutch nut threaded on one of said screw shafts, said clutch nut having a conical clutch surface adapted to engage the hub conical clutch surface for providing driving engagement, the other of said driving clutch members comprising, in combination:
   a nut member threaded on the other of said screw shafts, said nut member including a plurality of radial recesses opening toward the hub surface, each of said recesses including a cam surface eccentrically located relative to the axis of said nut member;
   apertured cage means positioned on the peripheral portion of said nut member, said cage member being axially fixed and rotatably movable relative to said nut member, each of said cage apertures being adapted to overlie one of said nut member recesses;
   a roller of a predetermined diameter positioned in each recess and having a portion thereof extending through an overlying aperture in said cage means, said rollers adapted to be wedged between the cam surface and the hub for establishing a unidirectional driving connection; and,
   spring means formed on the cage means biased into engagement with the hub for rotating the cage responsive to relative rotation between the hub and cage means, whereby said cage means urge said rollers into and out of a wedged position.

4. In a two-speed hub for velocipedes and the like:
   a stationary axle;
   a hub rotatably mounted relative to the axle;
   a first screw shaft journalled on the axle;
   a first nut member threaded on said first screw shaft, said first nut member including a plurality of radial recesses opening toward the hub, each of said recesses including a cam surface eccentrically located relative to the axis of said first nut member;
   a second screw shaft journalled on said first screw shaft;
   a second nut member threaded on said second screw shaft for drivingly engaging the hub;
   means for frictionally and yieldably retarding said nut members;
   means for rotating said screw shafts in forward and backward directions at different speeds respectively;
   apertured cage means supported on the peripheral portion of said first nut member, said cage means being axially fixed and rotatably movable relative to said first nut member, each of said apertures being adapted to overlie one of said first nut member recesses;
   a roller of a predetermined diameter positioned in each of said first nut member recesses and having a portion thereof extending through an overlying aperture in said cage means, said rollers adapted to be wedged between the recess cam surface and the hub for establishing a unidirectional driving engagement with the hub; and,
   means responsive to relative rotation between the first nut member and hub for urging said rollers into and out of a wedged position.

5. A device as set forth in claim 4 in which the means responsive to relative rotation between the hub and first nut member comprises a plurality of spring fingers formed on said cage means biased into frictional engagement with said hub, said spring fingers rotatably driving said cage means relative to said first nut member whereby the rollers are urged into and out of a wedged position.

6. In a two-speed hub and coaster brake for velocipedes and the like:
   a fixed axle;
   an anchor member secured to the axle;
   a hub rotatably mounted relative to the axle;
   brake means interengaging the axle means and the hub for braking hub rotation;
   a low speed screw shaft journalled on the axle;
   a low speed clutch nut threaded on the low speed screw shaft adapted to operatively engage the brake means, said low speed clutch nut including a plurality of radial recesses opening toward the hub, each of said recesses including a cam surface eccentrically located relative to the axis of said low speed clutch nut;
   apertured cage means supported on the low speed clutch nut, said cage means being axially fixed and rotatably movable relative to said low speed clutch nut, said cage apertures being adapted to overlie one of said low speed clutch nut recesses;
   a roller of a predetermined diameter positioned in each of said low speed clutch nut recesses and having a portion thereof extending through an overlying aperture in said cage means, said rollers adapted to be wedged between the recess cam surface and the hub for establishing a unidirectional driving engagement with the hub;
   means responsive to relative rotation between the low speed clutch nut and the hub for urging said rollers into and out of a wedged position;

a high speed screw shaft journalled on the low speed screw shaft;
a high speed clutch nut threaded on the high speed screw shaft for drivingly engaging the hub;
a driving member;
gear means for rotating the screw shafts at different speeds relative to each other; and
retarder means frictionally and yieldably retarding the clutch nuts.

7. A device as set forth in claim 6 in which the means responsive to relative rotation between the hub and low speed clutch nut comprises a plurality of radially depending spring fingers formed on said cage member biased into frictional engagement with said hub, said spring fingers rotatably driving said cage means relative to said low speed clutch nut whereby the rollers are urged into and out of a wedged position.

8. A device as set forth in claim 6 in which said low speed screw shaft includes shoulder means adapted to limit axial threading movement of said low speed clutch nut away from the brake means.

References Cited in the file of this patent
UNITED STATES PATENTS

| | | |
|---|---|---|
| 2,854,108 | Douglas | Sept. 30, 1958 |
| 2,892,521 | Spencer | June 30, 1959 |
| 2,972,908 | Hood et al. | Feb. 28, 1961 |